UNITED STATES PATENT OFFICE.

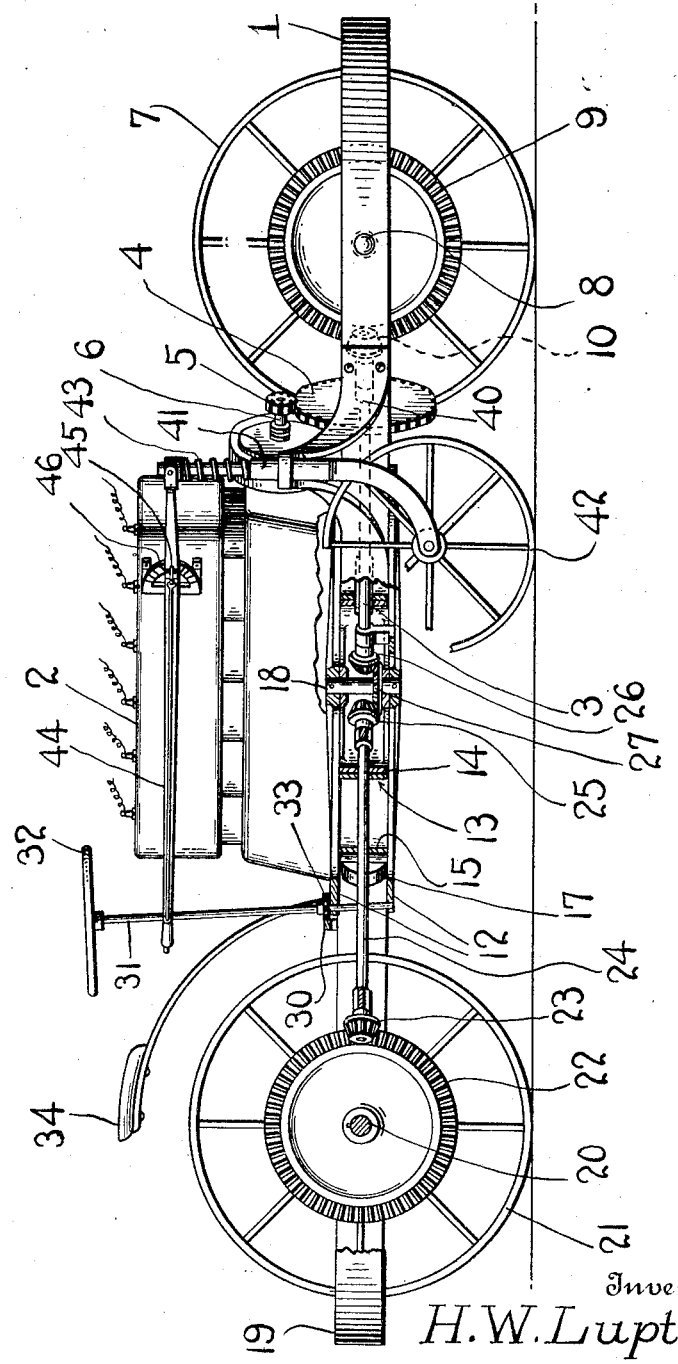

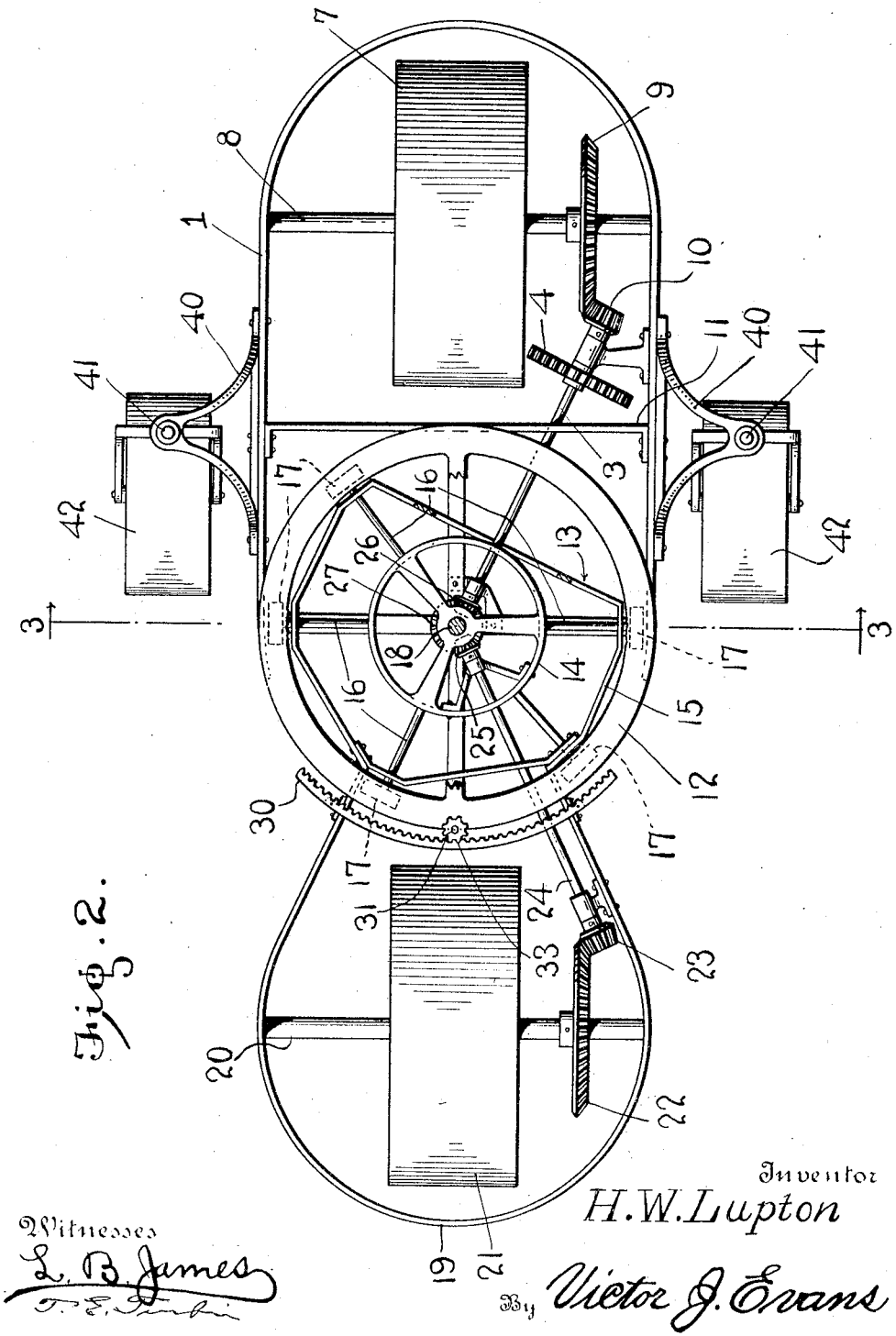

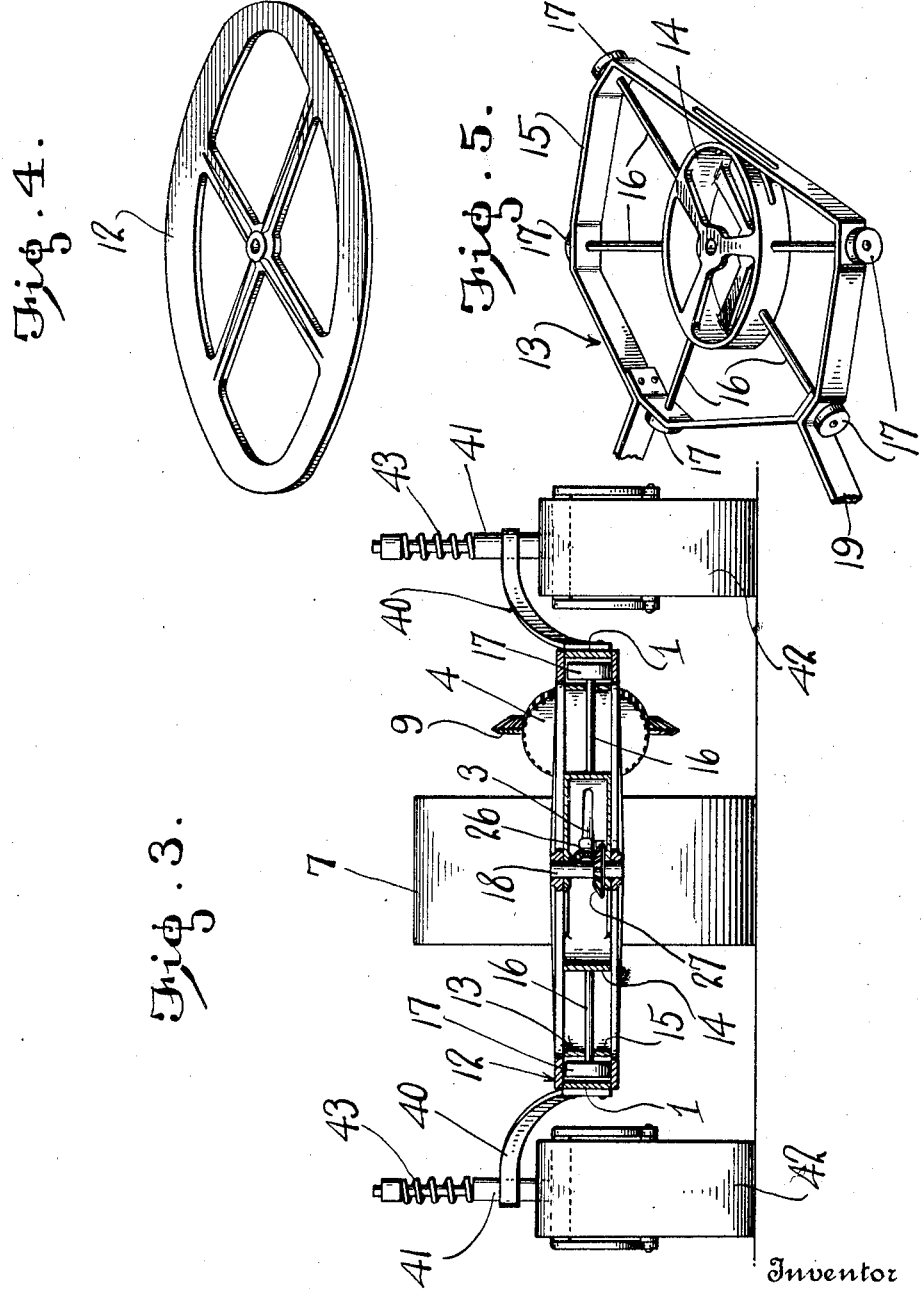

HENRY W. LUPTON, OF LOS GATOS, CALIFORNIA.

TRACTOR.

1,327,485.  Specification of Letters Patent.  Patented Jan. 6, 1920.

Application filed February 24, 1919. Serial No. 278,584.

*To all whom it may concern:*

Be it known that I, HENRY W. LUPTON, a citizen of the United States, residing at Los Gatos, in the county of Santa Clara and State of California, have invented new and useful Improvements in Tractors, of which the following is a specification.

My present invention pertains to tractors; and it has for one of its objects to provide a two wheel drive tractor embodying such a construction and relative arrangement of parts that the steering is accomplished through the medium of the rear wheel and the said rear wheel is made to follow the path of the forward wheel.

Another object of the invention is the provision of a two wheel drive tractor that is adapted to be used to advantage on a hillside, as well as upon level ground.

Other objects and practical advantages of the invention will be fully understood from the following description and claims when the same are read in connection with the drawings, accompanying and forming part of this specification, in which:

Figure 1 is a view partly in side elevation and partly in longitudinal vertical section, showing the tractor construction constituting the best practical embodiment of my invention of which I am cognizant.

Fig. 2 is a view partly in plan and partly in horizontal section, of the same.

Fig. 3 is a transverse section taken in the plane indicated by the line 3—3 of Fig. 2, looking forwardly.

Figs. 4 and 5 show details.

Similar numerals of reference designate corresponding parts in all of the views of the drawings.

Among other elements, my novel tractor comprises a forward horizontally disposed main frame 1. This frame 1 is of general U-shape in plan with the bight of the loop foremost, and on the said frame is supported the motor 2, which may be of the type illustrated or of any other type compatible with the purpose of my invention. The said main frame also serves to support a shaft 3, which is disposed as best shown in Fig. 2 and is connected through intermeshed spur gears 4 and 5 with the engine shaft 6, as best shown in Fig. 1.

The forward traction wheel 7 of the tractor is mounted between the side bars of the frame 1 and is fixed on a transverse shaft 8, journaled in said side bars. Also fixed on the shaft 8 is a miter gear 9 that is intermeshed with a miter pinion 10 on the shaft 3, whereby, as will be readily understood, the wheel 7 is driven from the shaft 3.

An interposed transverse brace bar 11 is fixedly connected at its ends to the side bars of the main frame 1 with a view to lending increased stiffness and strength to the main frame.

Arranged above and below and against the rear portions of the side bars of the main frame and fixedly connected to the said side bars are horizontally disposed annular plates 12, and revoluble between the said plates 12 is a horizontally disposed frame 13, which, in the preferred embodiment of the invention, comprises an inner annular member 14, an outer member 15, and shafts 16, journaled in the inner and outer members and carrying anti-friction wheels or rollers 17, which bear and travel against the plates 12. The said frame 13 revolves about an upright fixed post 18, and is fixedly connected to and movable with a rear frame section 19, the latter being in plan of general U-shape, as best shown in Fig. 2.

Arranged transversely in the frame section 19 is a shaft 20 that carries the rear traction wheel 21. Also fixed on the said shaft 20 is a miter gear 22, which is intermeshed with a miter gear 23 on a drive shaft 24. This shaft 24 is equipped at its end with a miter gear 25. The shaft 3 is equipped at its rear end with a miter gear 26, and this gear 26 is connected to an idler gear 27 on the post 18 with the gear 25. From this it follows that the rear traction wheel 21, as well as the front traction wheel 7, will be driven from the shaft 3; also, that notwithstanding the swinging of the rear frame section in a horizontal plane, the driving connection to the rear traction wheel 21 will not be interfered with or otherwise affected, this being due to the capacity of the miter gear 25 to travel about the miter gear 27.

Suitably fixed to the section 19 of the rear frame is a segmental rack bar 30, and journaled in suitable manner on the rear portion of the forward or main frame is a steering shaft 31, equipped with a wheel 32 and carrying a pinion 33 that is intermeshed with the rack bar 30. The hand wheel 32 is arranged in convenient position relative to the driver's seat 34, which is supported as shown on the rear portion of the main frame. Manifestly, by turning the hand wheel 32 the driver is enabled to swing the rear frame or frame section in a horizontal plane and thereby steer the tractor; the traction wheels being so relatively arranged as shown that the rear wheel will follow in the path of the forward one.

Brackets 40 are fixed to and extend laterally outward from the side bars of the main frame 1, and movable vertically in said brackets are the stems 41 of caster wheels 42, which are designed to carry only sufficient weight to maintain the tractor in a vertical position. The said stems 41 and the caster wheels carried thereby are cushioned by coiled springs 43. Said stems 41 are also connected to levers 44, which are equipped with detents 45 to engage segmental lugs 46. By virtue of this construction it will be observed that the caster wheel supports may be adjustably fixed in such positions relative to the main frame as will enable the tractor to operate as well on a hillside as on level ground.

It will be apparent from the foregoing that, while simple and inexpensive in construction, my novel tractor is susceptible of being conveniently handled and is possessed of large traction capacity; and it will also be appreciated that notwithstanding its advantages the tractor is compact and strong in construction and is, therefore, well adapted to withstand the rough usage to which tractors are ordinarily subjected.

Having described my invention, what I claim and desire to secure by Letters Patent, is:—

1. A tractor comprising a main frame, a transverse shaft mounted in the main frame and bearing a traction wheel and a miter gear, horizontally disposed spaced annular plates, fixed to the rear portion of the main frame, a central upright post carried by the main frame, a miter gear loosely mounted on said post, a shaft journaled in the main frame and bearing miter gears intermeshed with the miter gear on the shaft of the forward traction wheel and the miter gear on the post, respectively, a motor carried on the main frame, a driving connection intermediate the motor and said shaft, a revoluble frame interposed between the annular plates and having anti-friction wheels engaging said plates, and also having its center of movement about the post, a rear frame section fixed with respect to the revoluble frame, a transverse shaft journaled in said rear frame section, and bearing a traction wheel and a miter gear, and a shaft journaled in the rear frame and having a miter gear at one end intermeshed with the loose miter gear on the post, and also having a miter gear intermeshed with the miter gear fixed on the shaft of the rear traction wheel.

2. A tractor comprising a main frame, a transverse shaft mounted in the main frame and bearing a traction wheel and a miter gear, horizontally disposed spaced annular plates, fixed to the rear portion of the main frame, a central upright post carried by the main frame, a miter gear loosely mounted on said post, a shaft journaled in the main frame and bearing miter gears intermeshed with the miter gear on the shaft of the forward traction wheel and the miter gear on the post, respectively, a motor carried on the main frame, a driving connection intermediate the motor and said shaft, a revoluble frame interposed between the annular plates and having anti-friction wheels engaging said plates, and also having its center of movement about the post, a rear frame section fixed with respect to the revoluble frame, a transverse shaft journaled in said rear frame section, and bearing a traction wheel and a miter gear, a shaft equipped with miter gears and interposed between and connecting the loose gear on the post and the miter gear on the shaft of the rear traction wheel, a segmental rack bar fixed to the rear frame, and a steering shaft mounted on the main frame and having a pinion intermeshed with the segmental rack bar.

3. A tractor comprising a main frame, a transverse shaft mounted in the main frame and bearing a traction wheel and a miter gear, horizontally disposed spaced annular plates, fixed to the rear portion of the main frame, a central upright post carried by the main frame, a miter gear loosely mounted on said post, a shaft journaled in the main frame and bearing miter gears intermeshed with the miter gear on the shaft of the forward traction wheel and the miter gear on the post, respectively, a motor carried on the main frame, a driving connection intermediate the motor and said shaft, a revoluble frame interposed between the annular plates and having anti-friction wheels engaging said plates, and also having its center of movement about the post, a rear frame section fixed with respect to the revoluble frame, a transverse shaft journaled in said rear frame section, and bearing a traction wheel and a miter gear, a shaft equipped with miter gears and carried by the rear frame and interposed between and connecting the loose miter gear on the post and the miter gear on the shaft of the rear traction wheel, means for adjusting and adjustably fixing the rear frame relative to the forward main frame, and caster wheels mounted at opposite sides of and spaced from the main frame.

4. A tractor comprising a main frame, a transverse shaft mounted in the main frame and bearing a traction wheel and a miter gear, horizontally disposed spaced annular plates, fixed to the rear portion of the main frame, a central upright post carried by the main frame, a miter gear loosely mounted on said post, a shaft journaled in the main frame and bearing miter gears intermeshed with the miter gear on the shaft of the forward traction wheel and the miter gear on the post, respectively, a motor carried on the main frame, a driving connection intermediate the motor and said shaft, a revoluble frame interposed between the annular plates and having anti-friction wheels engaging said plates, and also having its center of movement about the post, a rear frame section fixed with respect to the revoluble frame, a transverse shaft journaled in said rear frame section, and bearing a traction wheel and a miter gear, a shaft carried by the rear frame and equipped with miter gears and effecting connection between the loose miter gear on the post and the miter gear on the shaft of the rear traction wheel, means for adjusting and adjustably fixing the rear frame relative to the forward main frame, brackets fixed to and extending outwardly from the sides of the main frame, stems movable vertically in said brackets and carrying caster wheels, springs for cushioning said stems, means for depressing the stems, and means for adjustably fixing the stems relative to the main frame.

5. A tractor comprising a main frame, traction means carried thereby, horizontally disposed spaced annular plates fixed to the rear portion of the main frame, a motor carried on the main frame, a driving connection intermediate the motor and said traction means, a revoluble frame interposed between the annular plates and having anti-friction wheels engaging said plates, a rear frame section fixed with respect to the revoluble frame, traction means carried by said rear frame section, a driving connection intermediate the motor and said traction means, means for adjusting and adjustably fixing the rear frame relatively to the forward main frame, and caster wheels mounted at opposite sides of the main frame.

In testimony whereof I affix my signature.

HENRY W. LUPTON.